United States Patent
Raghunath

(10) Patent No.: US 8,046,492 B1
(45) Date of Patent: Oct. 25, 2011

(54) OFFSET INDEPENDENT FILTERING

(75) Inventor: Balakrishna Raghunath, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 464 days.

(21) Appl. No.: 11/935,649

(22) Filed: Nov. 6, 2007

(51) Int. Cl.
G06F 15/16 (2006.01)

(52) U.S. Cl. ........ 709/242; 709/238; 709/245; 709/246; 370/464; 370/912; 707/758; 707/802

(58) Field of Classification Search .................. None
See application file for complete search history.

(56) References Cited

U.S. PATENT DOCUMENTS

| | | | | |
|---|---|---|---|---|
| 4,081,612 A * | 3/1978 | Hafner | ........................... | 370/393 |
| 5,293,488 A * | 3/1994 | Riley et al. | ..................... | 709/244 |
| 5,371,852 A * | 12/1994 | Attanasio et al. | ............. | 709/245 |
| 5,485,579 A * | 1/1996 | Hitz et al. | ...................... | 709/221 |
| 5,515,513 A * | 5/1996 | Metzger et al. | ................ | 709/249 |
| 5,563,878 A * | 10/1996 | Blakeley et al. | ............... | 370/392 |
| 5,570,366 A * | 10/1996 | Baker et al. | ..................... | 370/312 |
| 5,608,662 A * | 3/1997 | Large et al. | .................... | 708/300 |
| 5,802,278 A * | 9/1998 | Isfeld et al. | .................... | 709/249 |
| 5,842,224 A * | 11/1998 | Fenner | ............................ | 711/202 |
| 5,854,899 A * | 12/1998 | Callon et al. | ................... | 709/238 |
| 5,867,494 A * | 2/1999 | Krishnaswamy et al. | .... | 370/352 |
| 5,916,306 A * | 6/1999 | Ruiz | .............................. | 709/242 |
| 5,996,021 A * | 11/1999 | Civanlar et al. | ............... | 709/238 |
| 6,018,524 A * | 1/2000 | Turner et al. | ................... | 370/392 |
| 6,067,569 A * | 5/2000 | Khaki et al. | ................... | 709/224 |
| 6,092,110 A * | 7/2000 | Maria et al. | .................... | 709/225 |
| 6,128,298 A * | 10/2000 | Wootton et al. | ............... | 370/392 |
| 6,147,976 A * | 11/2000 | Shand et al. | .................... | 370/254 |
| 6,158,008 A * | 12/2000 | Maria et al. | ..................... | 726/13 |
| 6,216,173 B1 * | 4/2001 | Jones et al. | ..................... | 715/705 |
| 6,272,136 B1 * | 8/2001 | Lin et al. | ....................... | 370/392 |
| 6,282,575 B1 * | 8/2001 | Lin et al. | ....................... | 709/244 |
| 6,335,935 B2 * | 1/2002 | Kadambi et al. | .............. | 370/396 |
| 6,347,087 B1 * | 2/2002 | Ganesh et al. | ................. | 370/392 |
| 6,389,532 B1 * | 5/2002 | Gupta et al. | ................... | 713/163 |
| 6,430,188 B1 * | 8/2002 | Kadambi et al. | .............. | 370/398 |
| 6,434,134 B1 * | 8/2002 | La Porta et al. | ............... | 370/338 |
| 6,434,170 B1 * | 8/2002 | Movshovich et al. | ........ | 370/536 |
| 6,570,875 B1 * | 5/2003 | Hegde | ........................... | 370/389 |
| 6,581,106 B1 * | 6/2003 | Crescenzi et al. | ............. | 709/242 |
| 6,606,710 B2 * | 8/2003 | Krishnan et al. | ................ | 726/13 |
| 6,707,814 B1 * | 3/2004 | Ohgane | ......................... | 370/389 |
| 6,876,653 B2 * | 4/2005 | Ambe et al. | .................... | 370/389 |
| 6,915,457 B1 * | 7/2005 | Miller | ............................. | 714/43 |
| 6,963,913 B2 * | 11/2005 | Komisky | ....................... | 709/225 |
| 6,965,945 B2 * | 11/2005 | Lin et al. | ........................ | 709/242 |
| 6,976,089 B2 * | 12/2005 | Na et al. | ......................... | 709/242 |
| 6,981,085 B2 * | 12/2005 | Tree et al. | ...................... | 710/300 |
| 7,020,137 B2 * | 3/2006 | Kadambi et al. | .............. | 370/389 |
| 7,433,355 B2 * | 10/2008 | Wilson et al. | ................. | 370/392 |
| 7,668,270 B2 * | 2/2010 | Nguyen | ......................... | 375/350 |
| 2007/0110053 A1 * | 5/2007 | Soni et al. | ..................... | 370/389 |

* cited by examiner

*Primary Examiner* — Apu Mofiz
*Assistant Examiner* — Hung Le
(74) *Attorney, Agent, or Firm* — Harrity & Harrity, LLP

(57) ABSTRACT

A device facilitates offset independent message filtering, and receives a filter registration request from a control software element, where the filter registration request includes at least a field name and a filter value. The device also identifies an offset value associated with the received field name, and filters a message based on the filter value and the identified offset value.

20 Claims, 6 Drawing Sheets

OFFSET INDEPENDENT FILTERING

BACKGROUND

Modern computing devices, such as general purpose computers, network devices (e.g., routers, etc.), consumer electronics devices, etc. typically operate based on a number of different software elements working together on top of an underlying operating system or kernel. Information or data relating to operation of the computing device and its various elements is typically passed between the software elements and the operating system in the form of messages. In some instances, it may be beneficial to filter such information so that each executing software element is not unnecessarily receiving each message.

Existing computing devices typically filter messages between software elements based on a filter value's location in the message being filtered. For example, a message filter may specify that a value of "12345" is found at a location "12" bytes from the beginning of the message. This offset value of "12" bytes indicates, with specificity, where the value to be filtered on is located.

Unfortunately, current filtering techniques do not adequately support changing the format of underlying messages or target software without requiring corresponding changes to the control software.

SUMMARY

In a first aspect, a method is provided that may include receiving a filter registration request from a control software element, where the filter registration request includes at least a field name and a filter value. An offset value associated with the received field name may be identified. A message may be filtered based on the filter value and the identified offset value.

In a second aspect, a device may include a memory; and a processor configured to execute one or more instructions contained in the memory, where the one or more instructions correspond to a target software and to a control software element, The target software may be configured to receive a filter registration request from the control software element, where the filter registration request includes at least a field name and a filter value, identify an offset value associated with the received field name, and filter a message based on the filter value and the identified offset value.

In a third aspect, a computer-readable medium may be provided that stores instructions executable by at least one processor. The computer-readable medium may include one or more instructions for generating a symbol table that maps field names to offset values; one or more instructions for receiving a message filter request that includes at least a filter value and a field name on which to perform filtering; one or more instructions for looking up an offset value corresponding to the received field name in the symbol table; and one or more instructions for filtering messages based on the offset value and the filter value.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Figure 1:
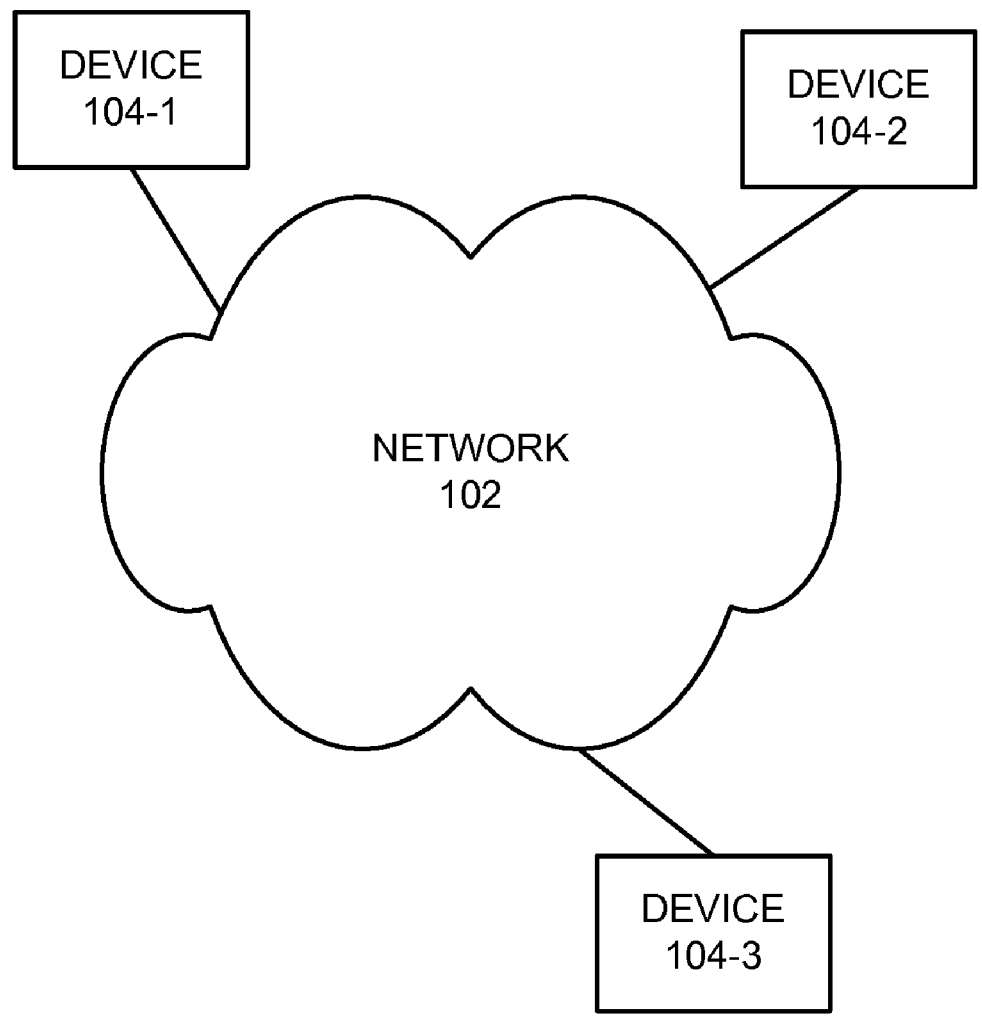
FIG. 1 illustrates an exemplary system according to an implementation consistent with the aspects described herein.

FIG. 1 illustrates an exemplary system 100 according to an implementation consistent with aspects described herein. As illustrated, system 100 may include a network 102, and devices 104-1, 104-2 and 104-3 (hereinafter collectively referred to as "devices 104") connected to network 102. Devices 104 may include servers, host computers, personal computers, wireless personal digital assistants (PDAs) or any other device capable of connecting to a network, such as network 102.

Network 102 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks.

System 100 may include more or fewer components than shown in FIG. 1. For example, system 100 may have more or fewer devices 104 connected to network 102.

Figure 2:
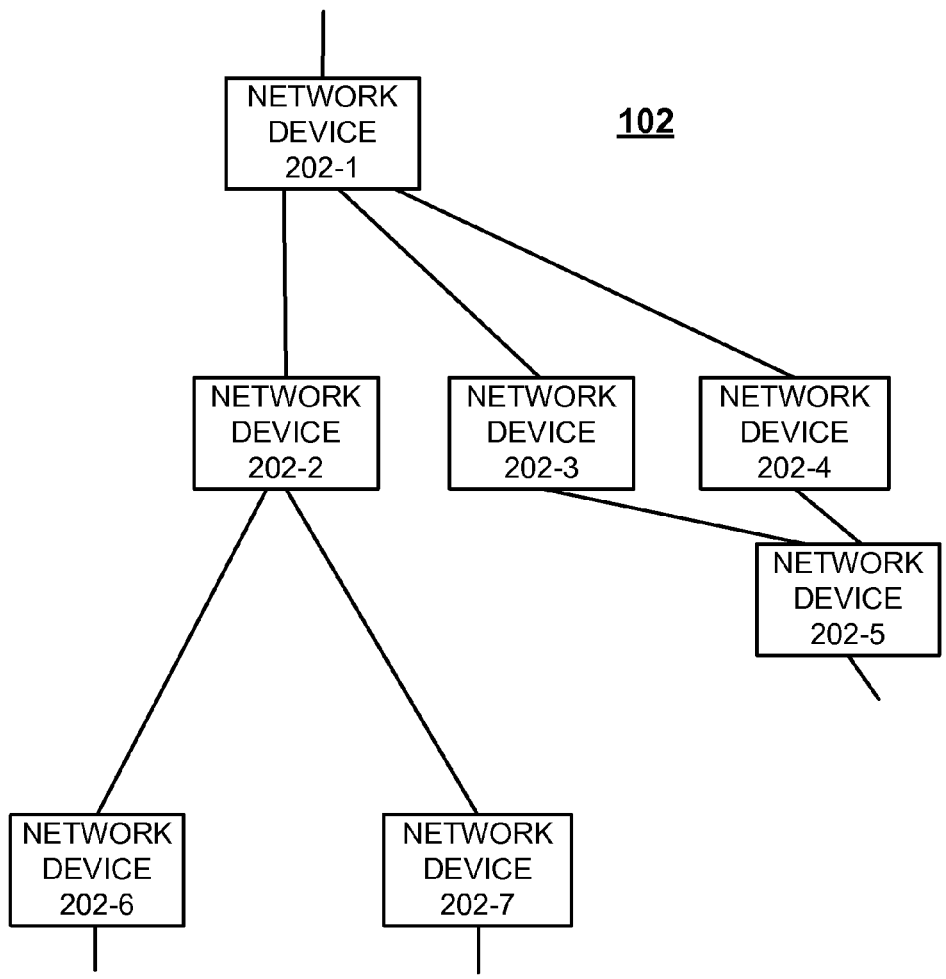
FIG. 2 illustrates a portion of a network shown in FIG. 1.

FIG. 2 illustrates a portion of network 102. As illustrated, the portion of network 102 may include a number of network devices 202-1 through 202-7 (hereinafter collectively referred to as "network devices 202"). The portion of network 102 may include additional or fewer network devices 202 than shown in FIG. 2. Each network device 202 may have connections with one or more other network devices, such as, for example, one or more routers or network nodes. These connections may be of any suitable type, such as wireless or wired connections.

Figure 3:
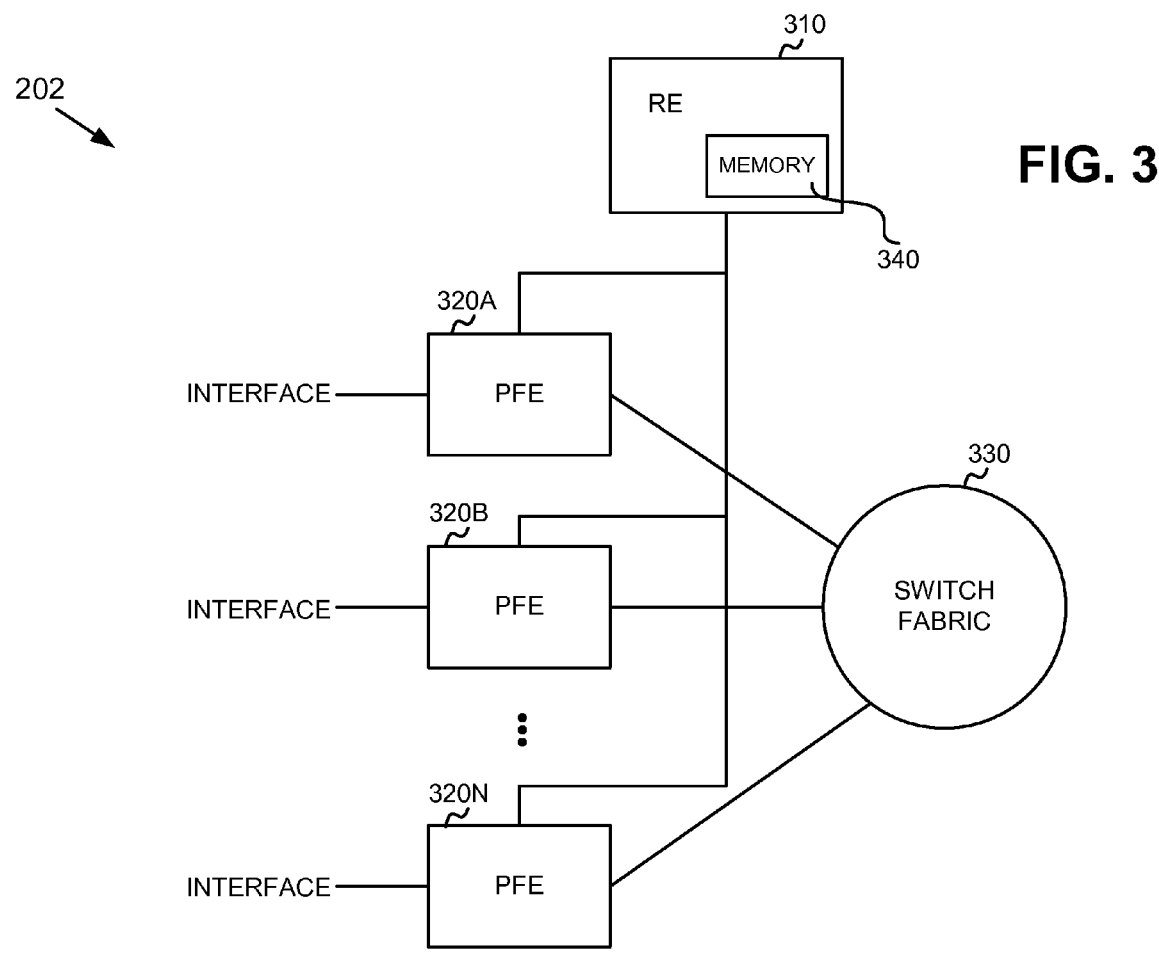
FIG. 3 is a functional block diagram of an exemplary network device of FIG. 2.

FIG. 3 is a functional block diagram of an exemplary network device 202 consistent with aspects described herein. In this particular implementation, network device 202 may take the form of a router 202. Network device 202 may receive one or more packet streams from a physical link, may process the packet stream(s) to determine destination information, and may transmit the packet stream(s) to a link in accordance with the destination information. As illustrated, network device 202 may include a routing engine (RE) 310, packet forwarding engines (PFEs) 320A, 320B, . . . , 320N (hereinafter collectively referred to "PFEs 320"), switch fabric 330, and memory 340.

RE 310 may perform high level management functions for network device 202. For example, RE 310 may maintain connectivity and may manage information and data for performing routing by network device 300. RE 310 may create routing tables based on network topology information, may create forwarding tables based on the routing tables, and may forward the forwarding tables to PFEs 320. PFEs 320 may use the forwarding tables to perform route lookup for incoming packets and perform the forwarding functions for network device 300. RE 310 may also perform other general control and monitoring functions for network device 202. RE 310 may include memory 340 for maintaining core routing information and symbol or naming information used to network device-level services. As will be described in additional detail below, RE 310 may facilitate offset independent filtering between software elements executing thereon.

PFEs 320 may each connect to RE 310 and switch fabric 330. PFEs 320 may receive packet data on physical interfaces or links connected to a network, such as network 102 (e.g., a WAN or a LAN). Each physical interface could be one of many types of transport media, such as optical fiber or Ethernet cable. The data on the physical interface may be formatted according to one of several protocols, such as the synchronous optical network (SONET) standard, an asynchronous transfer mode (ATM) technology, or Ethernet.

PFEs 320 may process incoming packet data prior to transmitting the data to another PFE or the network. PFEs 320 may also perform route lookup for the data, using the forwarding table from RE 310, to determine destination information. If the destination indicates that the data should be sent out on a physical link connected to one of PFEs 320, then the PFE may prepare the data for transmission by, for example, adding any necessary headers, and may transmit the data from the port associated with the physical interface. If the destination indicates that the data should be sent to another PFE via switch fabric 330, then PFE 320 may prepare the data for transmission to the other PFE, if necessary, and may send the data to the other PFE via switch fabric 330.

Figure 4:
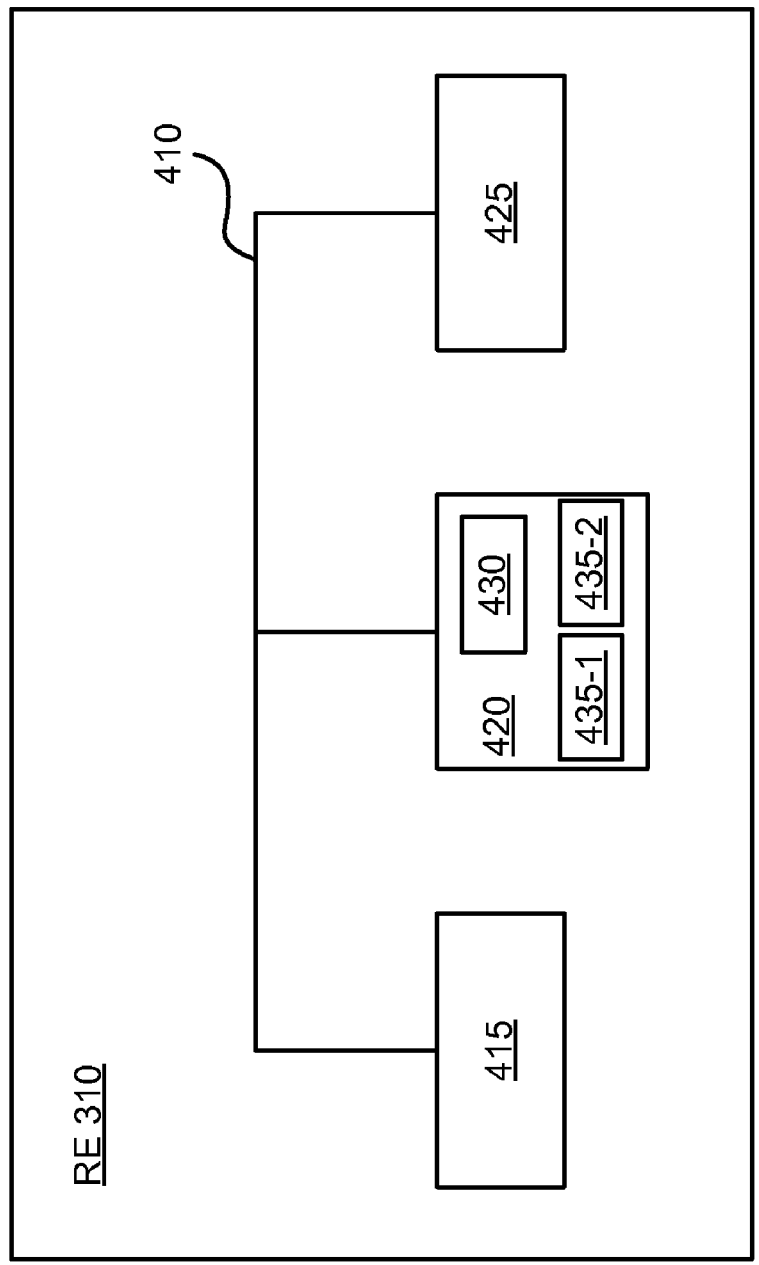
FIG. 4 is a detailed block diagram illustrating portions of a network device depicted in FIG. 2.

FIG. 4 is a detailed block diagram illustrating one exemplary implementation of RE 310. As described above, RE 310 may interconnect with PFEs 320 and switch fabric 330. RE 310 may compute a forwarding table, implement routing protocols, and/or run software to configure and manage network device 202. In one implementation, as illustrated in FIG. 4, RE 310 may include a bus 410 that may include a path that permits communication among a processor 415, a memory 420, and a communication interface 425. Processor 415 may include a microprocessor or processing logic (e.g., an application specific integrated circuit (ASIC), field programmable gate array (FPGA), etc.) that may interpret and execute instructions. Memory 420 may include a random access memory (RAM), a read only memory (ROM) device, a magnetic and/or optical recording medium and its corresponding drive, and/or another type of static and/or dynamic storage device that may store information and instructions for execution by processor 415. Communication interface 425 may include any transceiver-like mechanism that enables RE 310 to communicate with other devices and/or systems.

RE 310 (e.g., memory 420 of RE 310) may include one or more kernels 430 as components of an operating system. Kernel 430 may manage the components of network device 202, and may manage communication between hardware and software components of network device 202. Kernel 430 may provide an abstraction layer for components of network device 202 (e.g., for PFEs 320, processor 415, and memory 420) that applications may control to perform a service or function. In one implementation, kernel 430 may provide or support one or more daemons or control software elements 435-1 and 435-2 to manage one or more components of network device 202, and/or may provide services from network device 202. Relative to the daemons, kernel 430 may be referred to as the target software.

A "daemon," as the term is used herein, is to be broadly interpreted to include any type of daemon or control software element capable of being utilized by network device 202. A daemon may include, for example, a process that handles any periodic service request that network device 202 may expect to receive, a process that forwards service requests to other processes performed by network device 202, a process that responds to service requests, hardware activity, or other processes by performing some task, etc. In one example, network device 202 may include a protocol daemon 435-1 (e.g., a Secure Shell (SSH) transport protocol daemon) capable of providing authentication and/or encryption, and a service daemon 435-2 capable of providing services performable by network device 202.

Network device 202 may perform certain operations, as described in detail below. Network device 202 may perform these operations in response to processor 415 executing software instructions contained in a computer-readable medium, such as memory 420. A computer-readable medium may be defined as any physical or logical memory device.

The software instructions may be read into memory 420 from another computer-readable medium, such as a data storage device, or from another device via communication interface 425. The software instructions contained in memory 420 may cause processor 415 to perform processes that will be described later. Alternatively, hardwired circuitry may be used in place of or in combination with software instructions to implement processes described herein. Thus, implementations described herein are not limited to any specific combination of hardware circuitry and software.

Although FIGS. 3 and 4 show exemplary components of network device 202, in other implementations, network device 202 may contain fewer, different, or additional components than depicted in FIGS. 3 and 4. In still other implementations, one or more components of network device 202 may perform the tasks described as being performed by one or more other components of network device 202.

Offset Independent Filtering

In implementations consistent with aspects described herein, one or more daemons 435-1, 435-2 or other control software elements (collectively, "daemons 435" or "control software elements 435") may act on messages received by target software (e.g., kernel 430). However, each control software element (e.g., daemon) 435 typically may not require receipt of each message. Accordingly, filtering may be useful in reducing processor bandwidth required for each control software element 435 to execute. To this end, control software element 435 may specify filters for use by kernel 430 in filtering messages received from, for example, PFEs 320 or other components of network device 202, and presented or forwarded to the respective control software elements 435. In some implementations, messages may be self-generated by kernel 430. The filtering process may result in a subset of possible messages being passed back to a particular control software element 435 for subsequent processing, etc. Filtering may be performed on incoming messages for various purposes, such as, for example, routing socket monitoring in network device 202, etc.

Existing filtering conventions have provided filters to target software 430 using offsets associated with the element or field upon which the filter is based. The term "offset" refers to the location of the field or element within the structure of the message code as provided or stored in memory. For example, a common packet filtering application referred to as "tcpdump" enables filtering of Internet Protocol (IP) packets based on source internet protocol address using a known byte offset of "12." That is, because IP-protocol packets always include the source IP address beginning at a location "12" bytes from the start of the packet header, a filter may rely on this location in specifying a filter value.

This sort of offset-based filtering works very efficiently in circumstances in which an established protocol or standard maintains the offset values for the elements or objects on which the filtering may be performed. Unfortunately, the flexibility of such systems is significantly restrained. In the event that a message changes format, the known offsets on which the filtering is performed would be incorrect. For example, using the IP source address filtering example described above, assume that the packet structure had been modified such that the source address now appears at bytes "16-19" of the header file rather than at bytes "12-15." Because the offset of the element has changed, the filter would also need to change in order to ensure that the filtering was being properly performed on IP source address as opposed to IP destination address. This requirement introduces significant delays in the updating and implementation of changes to target software 430 and any control software elements 435 executing thereon.

Figure 5:
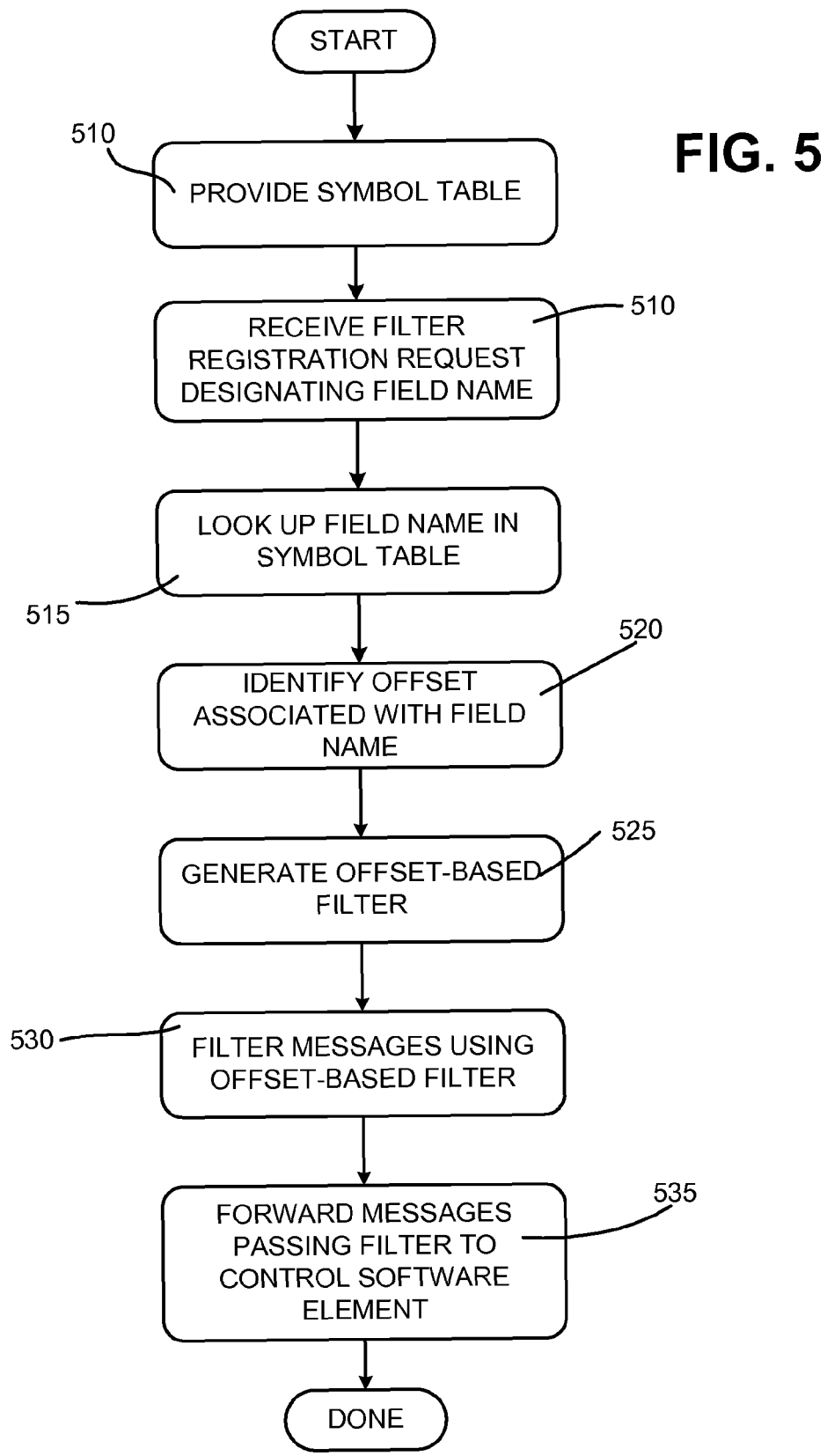
FIG. 5 is a flowchart that illustrates exemplary processing for facilitating offset independent filtering of messages or data by the network device depicted in FIG. 2.

FIG. 5 is a flow diagram that illustrates exemplary processing for facilitating offset independent filtering of messages or data by network device 202. Processing may begin with provision, generation, or compilation of a symbol table within RE 310 (block 505). In one implementation, the symbol table may include a mapping of offset locations of fields, structures, or elements defined within target software 430 to their corresponding symbolic field names. The symbol table may enable the description of defined elements (or symbols) using their plaintext defined names, rather than numeric addresses. The symbol table may be additionally usable while debugging or testing the compiled software. In one implementation, the symbol table may be generated if target software 430 is loaded into memory 420. Alternatively, the symbol table may be generated upon compilation of target software 430.

Figure 6:
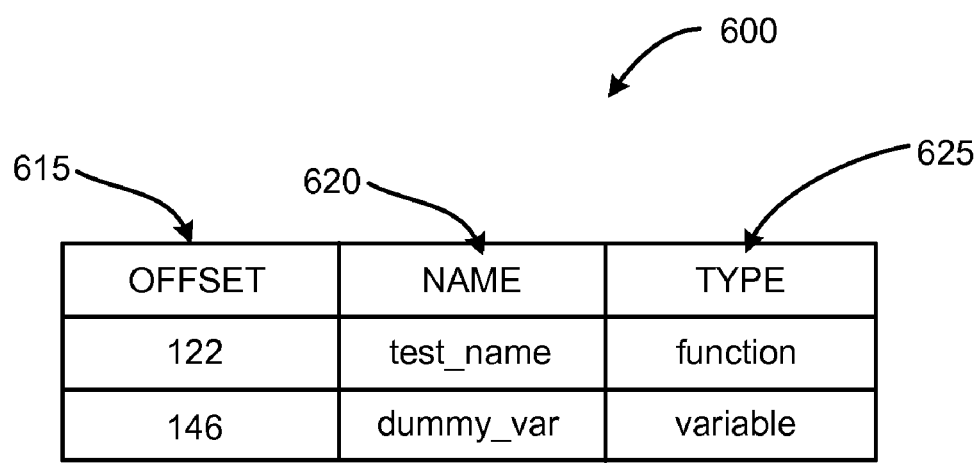
FIG. 6 illustrates an exemplary symbol table for use in the exemplary processing depicted in FIG. 5.

One example of a symbol table 600 is provided in FIG. 6. As shown, symbol table 600 may include a mapping of data element offset values (column 615) to symbolic names (column 620). Additionally, symbol table 600 may also include a type field (column 625). As described above, offset values may refer to a location of the associated element to the underlying software code or message structure. Data may be read into the above-disclosed table by methods and means known to those skilled in the art.

Returning to FIG. 5, control software element (e.g., daemon) 435 may transmit a filter registration request to target software 430 using a defined field or element name and a filter value or range of values corresponding to the filter (block 510). For example, using the above example, the registered filter may specify messages including an "IP source address" field with a value of "192.168.1.10." In some implementations, the message filter may be registered upon initial creation by the registering control software element 435 and may be updated with target software 430 upon subsequent modification or change.

Target software 430 may execute the filter by initially looking up the filter field or element name in the symbol table (block 515). Upon identification of the corresponding entry in the symbol table, the offset associated with the filter field or element may be identified (block 520). An offset-based filter may be generated based on the identified offset and the filter value received in the filter registration (block 525). Subsequent messages received, generated, or processed by the target software 430 may be filtered using the designated filter value and the identified offset (block 530). Messages passing the filter may be forwarded to the registering control software element(s) 435 for additional processing (block 535).

By providing for message filtering based on symbol table entries, rather than known or pre-configured offset values, modifications or updates to target software 430 or underlying message formats may be enabled without requiring corresponding modifications to the control software elements 435 or the filters associated with control software elements 435. Accordingly, target software changes or modifications may be implemented much more efficiently.

CONCLUSION

The foregoing description describes implementations of network devices that facilitate message filtering in an offset agnostic or offset independent manner. By supporting offset-independent filters, changes to underlying message formats or target software may be more efficiently implemented without requiring corresponding changes in the control software.

The foregoing description of exemplary embodiments provides illustration and description, but is not intended to be exhaustive or to limit the invention to the precise form disclosed. Modifications and variations are possible in light of the above teachings or may be acquired from practice of the invention. For example, configurations other than those described may be possible.

While a series of acts has been described with regard to FIG. 5, the order of the acts is not critical.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, in a network device, a filter registration request from a control software element, of the network device, where the filter registration request includes at least a field name and a filter value;
identifying, by the network device and based on a table, an offset value associated with the field name, included in the filter registration request, where the table maps the field name to the offset value;
generating, by the network device, a filter based on the filter value and the identified offset value;
filtering, by the network device and using the generated filter, a message, where the filtering includes:

identifying a first portion of the message based on the identified offset value, and
comparing the filter value to the portion of the message to determine whether the filter value matches the first portion of the message;
updating, by the network device, the table to map the field name to another offset value;
generating, by the network device, another filter based on the filter value and the other offset value; and
filtering, by the network device and using the other filter, another message.

2. The method of claim 1, further comprising:
forwarding the message to the control software element when the first portion of the message matches the filter value; and
forwarding the other message to the control software element when a first portion of the other message matches the filter value.

3. The method of claim 1, where identifying the offset value further comprises:
looking up the field name in the table; and
identifying the offset value associated with the field name in the table.

4. The method of claim 3, further comprising:
generating the table at compilation of target software receiving the filter registration request; and
storing the table in a memory of the network device.

5. The method of claim 3, further comprising:
generating the table upon execution of target software receiving the filter registration request; and
storing the table in a memory of the network device.

6. The method of claim 5, further comprising:
updating the target software, where updating the target software includes associating the field name with the other offset value, and
where the network device updates the table based on the field name being associated with the other offset value.

7. The method of claim 1, where the control software element comprises a daemon executing on a kernel.

8. The method of claim 7, where the kernel receives the filter registration request from the control software element.

9. The method of claim 1, where filtering the other message includes:
identifying a first portion of the other message based on the other offset value, and
comparing the filter value to the first portion of the other message to determine whether the filter value matches the second portion of the other message.

10. A device, comprising:
a memory; and
a processor to execute one or more instructions included in the memory, where the one or more instructions correspond to a target software and to a control software element,
where the target software is to:
receive a filter registration request from the control software element, where the filter registration request includes at least a field name and a filter value,
identify, based on a table, an offset value associated with the received field name, where the table includes a mapping of the field name to the offset value,
receive a message;
determine whether to forward the message to the control software element, where, when determining whether to forward the message, the processor is to:
identify data at a location within the message based on the identified offset value, and
compare the filter value to the identified data to determine whether the filter value matches the identified data,
forward the message to the control software element when the filter value matches the identified data,
update the table to map the field name to another offset value associated with the received field name,
identify, based on the updated table, the other offset value,
receive another message,
determine, based on the updated table whether to forward the other message to the control software element.

11. The device of claim 10, where the target software comprises a kernel executable by the processor.

12. The device of claim 10, where the control software element comprises a daemon executable by the processor.

13. The device of claim 10, where the target software is further to:
generate the table;
look up the field name in the table; and
identify the offset value associated with the field name in the table.

14. The device of claim 13, where the target software is further to:
generate the symbol table at one of compilation of the target software or initial execution of the target software.

15. The device of claim 13, where the target software is further to:
update the target software, where, when updating the target software, the target software is to associate the other offset value with the field name, and
where the table is updated based on the other offset value being associated with the field name.

16. The device of claim 10, where, when determining whether to forward the other message, the processor is to:
identify other data at a location within the message based on the other offset value, and
compare the filter value to the other data to determine whether the filter value matches the other data, and
forward the other message to the control software element when the filter value matches the other data.

17. A computer-readable medium that stores instructions executable by at least one processor, the computer-readable medium comprising:
one or more instructions to receive a filter registration request from a control element, where the filter registration request includes at least a field name and a filter value;
one or more instructions to identify based on a table, an offset value associated with a field name included in a filter registration request received from a control element, where the that table maps the field name to the offset value;
one or more instructions to generate a filter based on a filter value included in the filter registration request and the identified offset value;
one or more instructions to filter a message using the generated filter, where filtering the message includes:
identifying a first portion of the message based on the identified offset value; and
comparing the filter value to the portion of the message to determine whether the filter value matches the first portion of the message;
one or more instructions to update the table to map the field name to another offset value;

one or more instructions to look up the other offset value corresponding to the received field name;

one or more instructions to generate, based on the filter value and the other offset value, another filter; and one or more instructions to filter other messages based on the other offset value and the filter value using the other filter.

18. The computer-readable medium of claim 17, further comprising: one or more instructions to generate the table, where the one or more instructions to generate the table include:

one or more instructions to compile a target software; and one or more instructions to generate the symbol table during the compilation of the target software.

19. The computer-readable medium of claim 18, where the target software comprises:

a kernel executable by the at least one processor.

20. The computer-readable medium of claim 18, further comprising:

one or more instructions to receive an update to the target software;

one or more instructions to recompile the target software, based on the received update;

one or more instructions to update the symbol table in response to the update of the target software.

* * * * *